Figure 1:
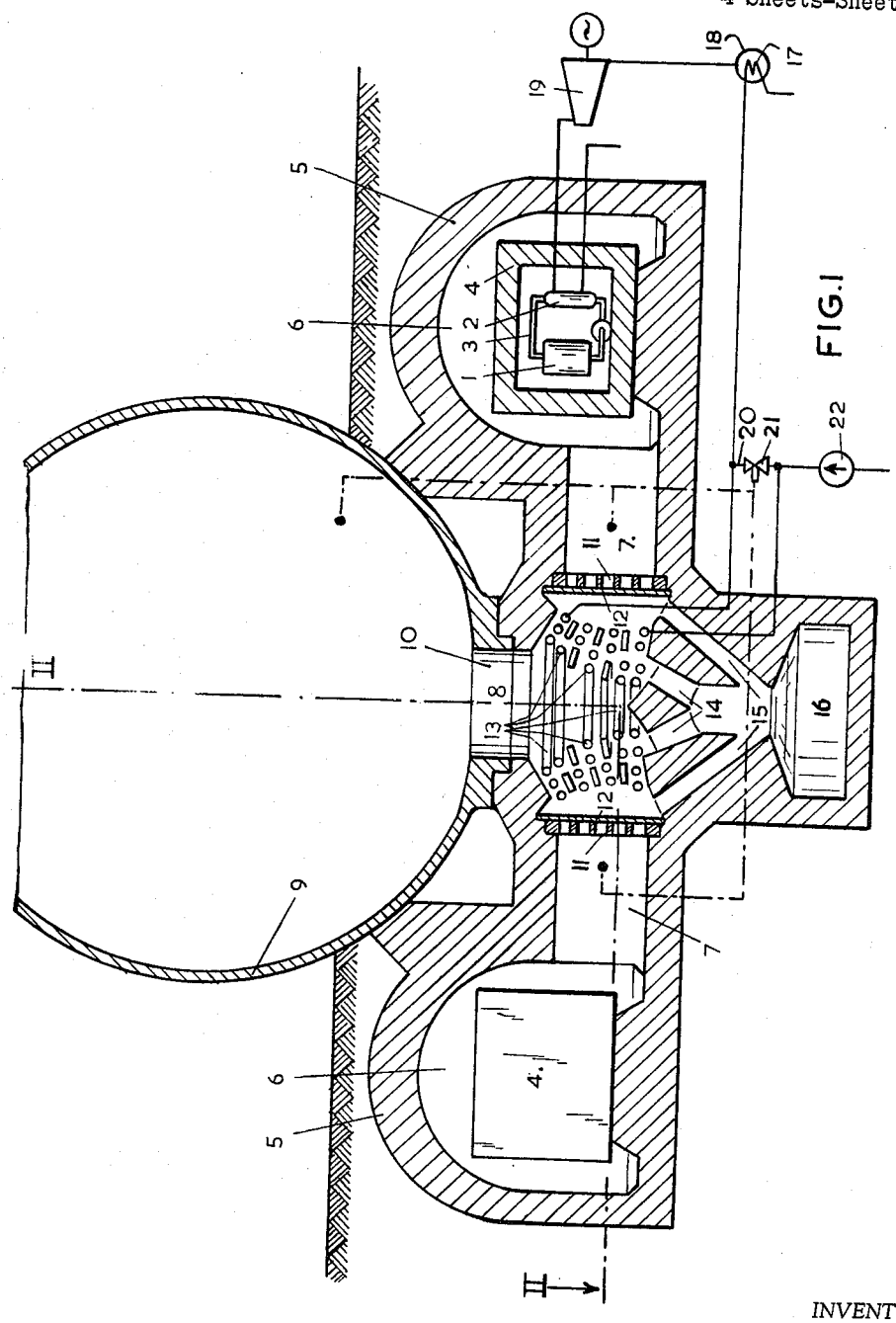

Feb. 1, 1966    J. J. WENT ETAL    3,232,843
CONTAINMENT SYSTEM FOR A PLURALITY OF NUCLEAR REACTOR UNITS
Filed Feb. 24, 1964    4 Sheets-Sheet 2

INVENTORS
JAN J. WENT
WOUTER G. BONSEL
BY
ATTORNEYS

INVENTORS
JAN J. WENT
WOUTER G. BONSEL

ATTORNEYS

United States Patent Office 3,232,843
Patented Feb. 1, 1966

3,232,843
CONTAINMENT SYSTEM FOR A PLURALITY OF NUCLEAR REACTOR UNITS
Jan J. Went, Arnhem, and Wouter G. Bonsel, Scheveningen, Netherlands, assignors to Reactor Centrum Nederland, The Hague, Netherlands
Filed Feb. 24, 1964, Ser. No. 346,648
Claims priority, application Netherlands, Feb. 26, 1963, 289,486
7 Claims. (Cl. 176—37)

The invention relates to a plant for the generation of self-maintaining nuclear fission reactions by means of neutrons, comprising a reactor system operating with a gaseous or liquid cooling medium and surrounded by a double walled envelope to protect the environment against radiation and radioactive substances and a separate gas-holder which is connected to the spaces confined between the walls of the envelope.

A plant of this kind is disclosed by the Belgian patent specification 554,008, in which a single reactor and the primary circuit of the heat transfer system is surrounded by a so-called biological shield, e.g. a housing of concrete, and together with said shield is contained in a gas-tight second envelope. The space between the biological shield and the second envelope is connected by a passage or a tunnel having a low resistance to an expandable gas-holder which serves as an expansion vessel for the radioactive gases, vapours and solid particles released, when an excursion or a rupture of a conduit in the reactor and the pressurized heat transfer circuit occurs, and prevents the generation of a dangerous high pressure within the second envelope adapted to hold the radioactive substance. This known plant has the disadvantage that one safeguarding gas-holder is required for each reactor, so that in power stations provided with more than one nuclear reactor a large part of the available area is occupied by the gas-holders.

The invention has for its object to avoid the said disadvantage, in other words, to provide a plant comprising a reactor system and a safeguarding gas-holder, of which the ratio between the power and the over-all dimensions is much more favourable. The invention comprises a reactor system formed by a group of individual reactors and accessories, each of which is surrounded by its own double walled envelope, that is by a biological shield and a gas-tight second envelope, the space confined between said shield and said second envelope of each reactor being connected to the gas-holder by an individual passage and a return shock safeguarding device being provided in each of the said passages, said safeguarding device operating towards the relevant reactor. The idea underlying the invention is, that the chance that an excursion or a rupture of a conduit occurs in two or more reactors at the same time is negligibly small, so that a gas-holder fit for one single reactor is also large enough for a plurality of reactors. The return shock safeguarding device prevents the radioactive gases, vapours or solid particles released in one of the reactors due to an excursion or a rupture of a conduit from reaching the envelopes of the other reactors, from which they can be difficultly removed.

Advantageously the return shock safeguarding devices may each consist of at least one tearable or breakable membrane which rests on its side facing the relevant reactor against a supporting lattice. This lattice must have such meshes as to support the membrane sufficiently to prevent its tearing or rupture at the expected highest possible pressure on the side facing the gas-holder.

Should a chamber containing a condenser and adapted to collect the condensate be provided in the space between the reactor system and the gas-holder, an arrangement is recommended in which the passages leading from the reactors to the gas-holder open into a common chamber communicating unobstructedly with the gas-holder, said common chamber containing the condenser and being adapted to collect the condensate. In that case the return shock safeguarding membranes may be provided in front of the openings, with which the passages leading from the reactors open into the condenser chamber.

If a great number of individual reactors is used, said reactors could be advantageously arranged in a circular series around the gas-holder and the chamber containing the condenser could be provided underneath or in the gas-holder.

To cool the condenser it may be connected before or in series with the cooling circuit of a steam condenser of at least one plant for the transformation of nuclear heat into mechanical energy and be by-passed by a conduit provided with an adjustable valve. Should the plant be so constructed as to have said valve adjusted in dependence on an increase of pressure in a connecting passage and/or the gas-holder, said valve may be so adjusted during normal operation as to permit only a small portion of the propelled cooling medium to pass through the condenser. However, should an excursion or a serious conduit rupture occur, said valve must be so adjusted as to allow a larger portion of the current of cooling medium or even all cooling medium to pass through the condenser.

Preferably, the condenser is provided with thick walled cooling pipes having a large heat absorbing power, so that at the occurrence of an excursion or a serious conduit rupture the condenser will be able to take up a large amount of heat at once. Then, only a small quantity of cooling water has to be passed through the condenser during normal operation which will be in favour of the economy of the plant.

Instead of a separate chamber containing a condenser a liquid lock provided in the gas-holder and between the passages leading from the reactors to the gas-holder and the gas collecting space of the gas-holder may be used. In that case the radio-active gases, vapours and solid particles escaping from a reactor will have to pass the said liquid lock before reaching the gas collecting space of the gas-holder. Also then said gases and vapours will be well cooled and more or less discontaminated or condensed.

Such a liquid lock may consist of two liquid containing communicating vessels, of which the upper ends are in open connection with the gas collecting space of the gas-holder and the passages leading from the reactors to the gas-holder, respectively. The liquid lock may also be formed by a single liquid containing vessel, the upper end of which is open towards the gas collecting space, said vessel being provided in or near its bottom with at least one check valve opening towards the liquid containing space of said vessel and separating said space of the vessel from the passages leading from the reactors to the gas-holder.

To increase the safety it is possible to provide in each one of the passages leading from a reactor to the gas-holder two return shock safeguarding devices arranged in series and to connect the space of said passage confined between the said two devices with the gas collecting space of the gas-holder by a pressure compensating conduit. Such a conduit prevents the production of a too strong sub-pressure in the passage space between those two return shock safeguarding devices and it need only to be very thin. If the two return shock safeguarding devices arranged in series consist of tearable or breakable membranes, it is recommended to make the membrane lying nearest to the relevant reactor stronger, so that it tears or breaks at a greater load than the membrane lying nearest to the gas-holder.

Figure 2:
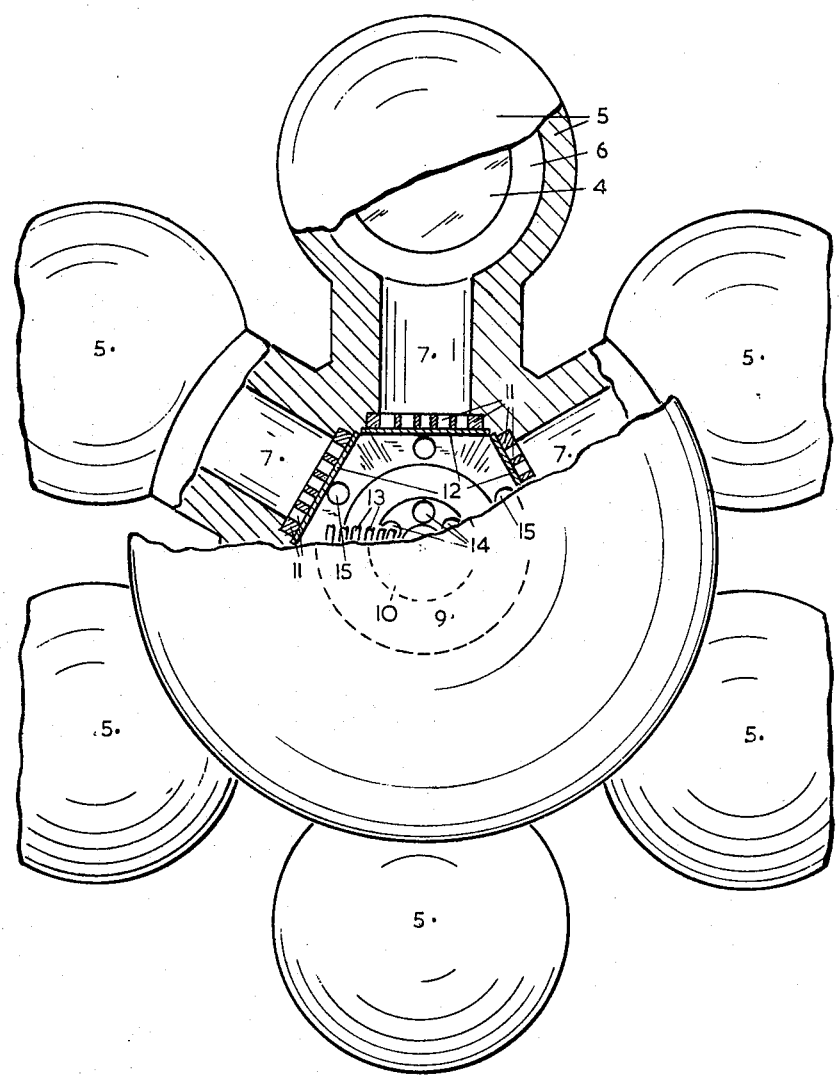
Figure 3:
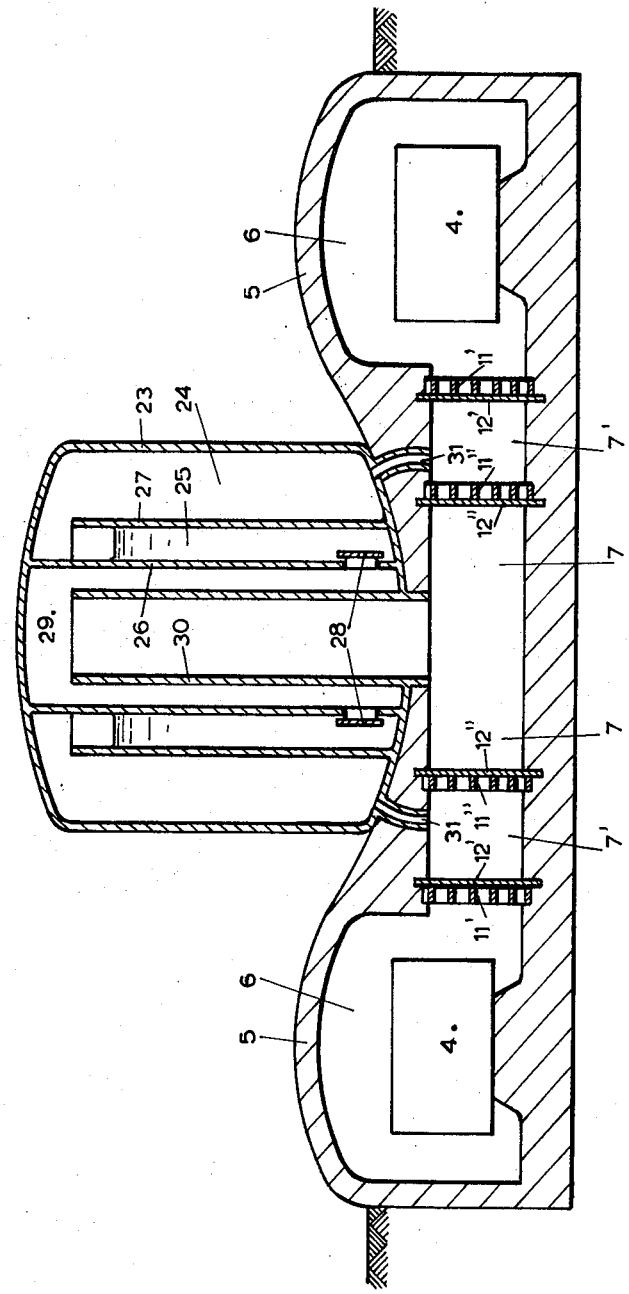
Figure 4:
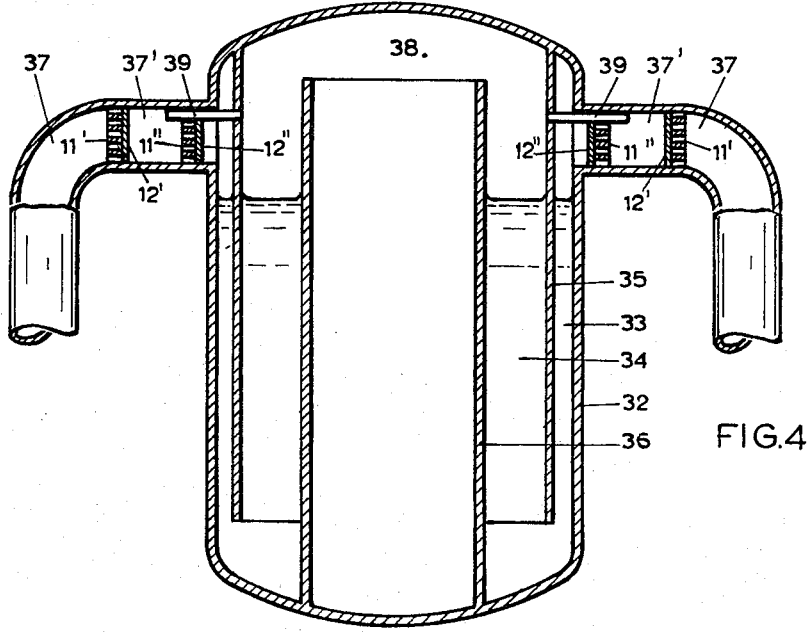
Figure 5:
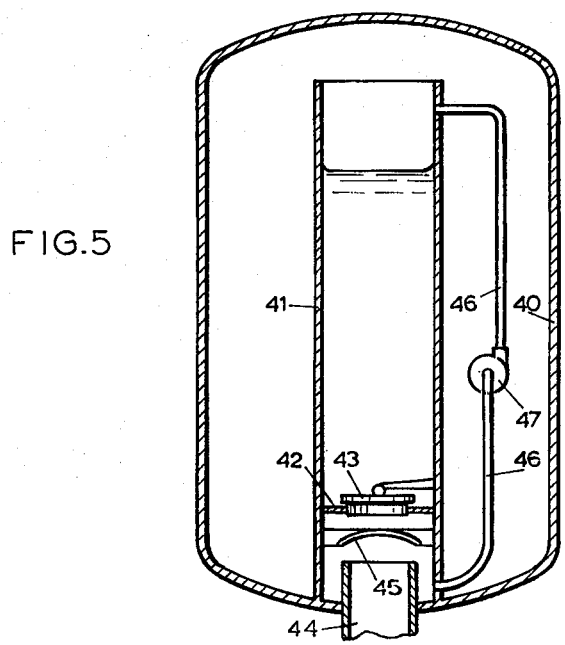

The invention will be elucidated with the aid of the accompanying drawing which illustrates various embodiments of the invention by way of example. In the drawing is:

FIG. 1 a vertical sectional view of a plant according to the invention, a part of which is illustrated diagrammatically, FIG. 2 partly a horizontal cross-sectional view and partly a plan view taken on the broken line II—II in FIG. 1, FIG. 3 a vertical sectional view of a variant of the plant according to FIG. 2 provided with a gas-holder comprising a water-lock, FIG. 4 a vertical sectional view of a gas-holder provided with a slightly different water-lock and FIG. 5 a vertical cross-sectional view of still another gas-holder provided with a water-lock.

In the drawing 1 is a nuclear reactor, 2 is a heat-exchanger and 3 is a part of a first pipe-line circuit filled with a cooling medium or a coolant-moderator for the transfer of energy. The nuclear reactor 1, the heat-exchanger 2 and the circuit 3 are surrounded by a first envelope 4, the so-called biological shield, which protects the environment against neutron and gamma radiation. The first envelope 4 is mounted in a relatively small gas-tight dome 5. The space 6 inside the dome 5 and outside the biological shield 4 is connected by a wide passage or tunnel 7 to a chamber 8 which lies beneath a spherical gas-holder 9 and communicates obstructedly with the latter by a wide passage 10. Mounted in the opening, with which the passage 7 opens into the chamber 8, is a supporting lattice 11 which is closed on the side facing the chamber 8 by a breakable or tearable membrane 12. A condenser 13 is contained in the chamber 8. Passages 14 and 15 lead the condensate to a second chamber 16 lying underneath the chamber 8, said chamber 16 being adapted to collect and to store the condensate which may contain expensive heavy water.

Mounted in a circular series around the gas-holder 9 are six domes 5 provided with nuclear reactors and accessories, each of which is connected by an individual passage 7 provided with a lattice 11 and a membrane 12 to the common chamber 8.

If an excursion or a rupture of a conduit of the circuit 2, 3 should occur, whereby radioactive gases, vapours and particles would escape through the joints of the biological shield 4 towards the space 6, said substances will flow substantially without resistance through the passage 7 to the membrane 12. If the pressure in the passage 7 then exceeds a predetermined value the membrane 12 will break or tear and the said products will be passed through the condenser 13 contained in the chamber 8 and through the passage 10 to the space within the gas-holder 9. The condensable gases and vapours will be partly condensed and the condensate will be collected in the chamber 16. The supporting lattices 11 ensure that at an increase of pressure in the chamber 8 the membranes in front of the exit openings of the passages 7 of the normally operating reactors remain intact and that the said passages remain closed, so that the released radioactive products of a faulty reactor cannot reach the domes 5 of the other reactors. This arrangement makes it possible to render the volume of the gas-holder small in regard to the total power of the plant, since the gas-holder need not be larger than is required for cooperation with one reactor only. The chance that two or more reactors become defective at the same time is negligibly small.

The condenser 13 is connected in series with and in front of the cooling circuit 17 of a steam condenser 18 which is inserted in the steam circuit of a turbine installation 19 fed by steam produced in the heat-exchanger 2. The condenser 13 is by-passed by a conduit 20 provided with an adjustable valve 21, which in the present case is automatically adjusted in dependency on the pressure obtained in the passages 7 and the space of the gas-holder. The valve 21 is normally so adjusted as to permit the greatest portion of the quantity of cooling water delivered by the pump 22 to flow directly to the condenser 18, so that only sufficient cooling water is passed through the condenser 13 to keep the latter at the required temperature. Preferably the pipes of the condenser 13 have a very thick wall, so that they are able to absorb much heat in a short time. Should an excursion or a serious rupture of a conduit occur in one of the nuclear reactors the pressure in the passage 7 will rise, the membrane 12 will break and also the pressure in the space of the gas-holder 9 will rise initially. Due to these increases of pressure the valve 21 will be closed, so that all cooling water will flow through condenser 13 and the heat-absorbing power of the latter will be considerably increased.

In the plant shown in FIG. 3 the reactor domes 6 are connected by passages 7 to a common gas-holder 23, the gas collecting space 24 of which is separated from the passages 7 by a water-lock. The water-lock is formed by a water containing annular vessel 25 provided in the gas-holder. The inner wall 26 of said vessel extends throughout the entire height of the gas-holder and the outer wall thereof extends to a place at short distance below the upper wall of the gas-holder. The inner wall 26 is provided near the bottom of the gas-holder with check valves 28, which open towards the water containing space 25 of the vessel 25, 26, 27. The passages 7 open by means of a central tube 30 into the space 29 of the gas-holder surrounded by the vessel 25, 26, 27 said central tube extending to a place slightly below the upper wall of the gas-holder. Each one of the passages 7 contain two supporting lattices 11', 11" cooperating with two tearable or breakable membranes 12', 12" mounted in series, of which the membrane 12' is stronger and, consequently, will break or tear at a larger load than the membrane 12". The gases released from a reactor space when an excursion or a rupture of a conduit occurs escape through a passage 7, the tube 30, the space 29, the check valves 28 and the water contained in the vessel 25, 26, 27 towards the gas-collecting space 24 of the gas-holder 23. During bubbling of said gases through the water they will be well cooled or condensed and partly discontaminated. In order to obtain a pressure compensation in the parts 7' of the passages 7 confined between the membranes 12' and 12" these passage parts 7' are each directly connected by a narrow conduit 31 with the gas collecting space 24 of the gas-holder 23.

FIG. 4 shows a gas-holder 32 for a reactor plant according to the invention, in which also a water-lock is provided. This water-lock is formed by two water containing communicating vessels 33, 34, which are defined by the wall of the gas-holder 32, a cylindric wall 35 extending to a place at a short distance from the bottom of the gas-holder and a cylindric wall 36 extending to a place at a short distance from the upper wall of the gas-holder. The space 33 above the water level communicates with the reactor domes (not shown) through tubes 37 comprising each two breaking or tearing membranes 12', 12". The space 34 is in open connection with the gas collecting space 38 of the gas-holder. Also in this case there are used narrow compensating conduits 39 extending between the gas collecting space 38 and the parts 37' of the tubes 37 confined between the membranes 12' and 12".

FIG. 5 relates to a gas-holder 40 having still another water-lock, which is formed by a water containing central tube 41 extending from the bottom of the gas-holder to a place at a short distance from the upper wall thereof. A check valve 43 is provided in the bottom 42 of the water space of the tube 41. The gas pipe 44 coming from the reactor domes (not shown) open into a chamber under the bottom 42. Mounted between said gas pipe and the check valve 43 is a baffle plate 45 which prevents water leaking into the gas pipe 44 when the check valve opens. Leakage water can be pumped back to the water space of the tube 41 through a conduit 46 provided with a pump 47.

What is claimed is:

1. A plant for the generation of self-maintaining nuclear fission reactions by means of neutrons, comprising a plurality of individual reactor units, biological shields and gas-tight envelopes, each biological shield surrounding a reactor unit and each envelope surrounding at same distance the assembly of a reactor unit and its biological shield, said shields and envelopes constituting double walled packets around the reactor units to protect the surroundings against radiation and contamination by radio active particles, a gas-holder including a gas collecting chamber, and a vessel containing a locking liquid body having two opposite ends, a part of said vessel above the liquid surface at one end of said liquid body being in open communication with said gas collecting chamber, a plurality of passages each leading from the space confined between the double walls of one of said jackets to a part of said vessel near the other end of said liquid body, a pair of spaced apart breakable membranes each supported by a lattice positioned in each of said passages to seal the passage under normal operating conditions of the plant, said lattices being positioned on the sides of the membranes facing away from the gas-holder, and a pressure compensating conduit leading directly from the space confined between each pair of membranes to said gas-collecting chamber.

2. A plant for the generation of self-maintaining nuclear fission reactions by means of neutrons, comprising a plurality of individual reactor units, biological shields and gas-tight envelopes, each biological shield surrounding a reactor unit and each envelope surrounding at some distance the assembly of a reactor unit and its biological shield, said shields and envelopes constituting double walled jackets around the reactor units to protect the surroundings against radiation and contamination by radio active particles, a gas-holder including a gas collecting chamber and a second chamber communicating with said gas collecting chamber, a condenser in said second chamber including a cooling circuit, a plurality of passages each leading from the space confined between the double walls of one of said jackets to said second chamber, a breakable membrane and supporting lattice positioned in each of said passages to seal the passage under normal operating conditions of the plant, at least one device for the transformation of nuclear heat into mechanical energy connected to said reactor units and including a steam condenser and a cooling circuit, the cooling circuit of said condenser in the second chamber being connected in advance of and in seres with the cooling circuit of said steam condenser, a conduit bypassing the cooling circuit of said condenser in the second chamber, an adjustable valve provided in said bypassing conduit, and means to control said valve.

3. A plant as claimed in claim 2 in which said means to control said valve operate in dependency on a variation of pressure in the part of each said passage between the gas-tight envelope and the membrane contained in said passage.

4. A plant as claimed in claim 2 in which said means to control said valve operate in dependency on a variation of pressure in the gas collecting chamber of the gas holder.

5. A plant as claimed in claim 2 in which said means to control said valve operate in dependency on a variation of pressure both in the part of each said passage between the gas-tight envelope and the membrane contained in the passage and in the gas collecting chamber of the gasholder.

6. A plant as claimed in claim 2 in which said condenser contained in the second chamber includes thick walled cooling pipes adapted to conduct a cooling medium and having themselves a large heat absorbing power.

7. A plant for the generation of self-maintaining nuclear fission reactions by means of neutrons, comprising a plurality of individual reactor units, biological shields and gas-tight envelopes, each biological shield surrounding a reactor unit and each envelope surrounding at some distance the assembly of a reactor unit and its biological shield, said shields and envelopes constituting double walled jackets around the reactor units to protect the surroundings against radiation and contamination by radio active particles, a gas collecting chamber, a plurality of passages each leading from the space confined between the double walls of one of said jackets to said gas collecting chamber, a breakable membrane and supporting lattice positioned in each of said passages to seal the passage under normal operating conditions of the plant, said gas collecting chamber being substantially only of a size necessary to retain the products of rupture of a single reactor unit, and said supporting lattices being positioned in engagement with the faces of said breakable membranes which are positioned toward said gas collecting chamber, whereby to prevent rupture products from one reactor unit reaching another reactor unit.

References Cited by the Examiner

UNITED STATES PATENTS 3,056,736 10/1962 Went et al. _____ 176—37
3,115,450 12/1963 Schanz _____ 176—37

FOREIGN PATENTS 905,684 9/1962 Great Britain.
252,909 1/1948 Switzerland.

OTHER REFERENCES

Bachel, German Patent Application No. 1,040,713, printed October 9, 1958.

LEON D. ROSDOL, *Primary Examiner.*

L. DEWAYNE RUTLEDGE, CARL D. QUARFORTH,
*Examiners.*

J. V. MAY, *Assistant Examiner.*